R. A. SCHULTZ.
RETAINER FOR BALL BEARINGS.
APPLICATION FILED AUG. 18, 1911.
1,032,953.
Patented July 16, 1912.
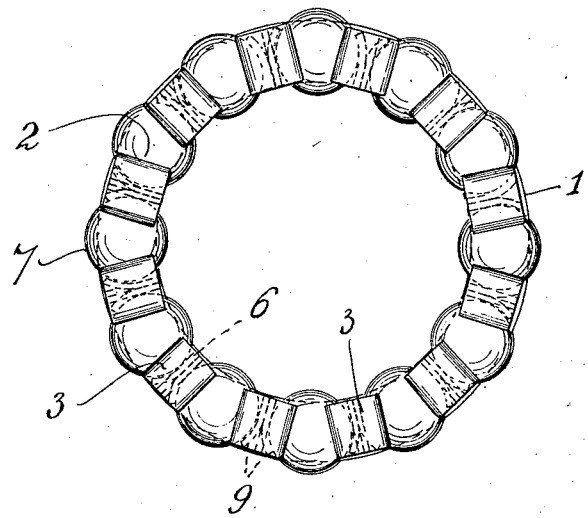
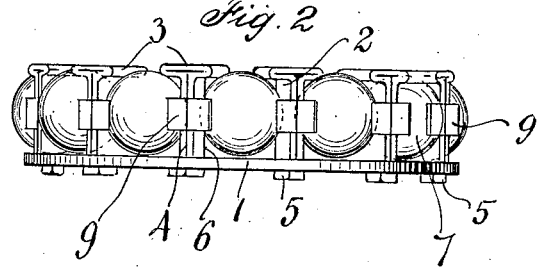
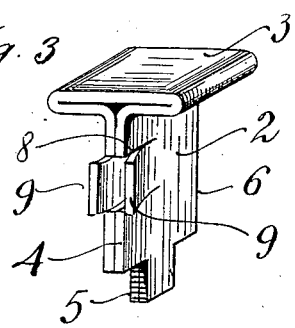
WITNESSES
INVENTOR
Richard A. Schultz
by Robt. Kloff
Atty.

UNITED STATES PATENT OFFICE.

RICHARD A. SCHULTZ, OF CHICAGO, ILLINOIS.

RETAINER FOR BALL-BEARINGS.

1,032,953.  Specification of Letters Patent.  Patented July 16, 1912.

Application filed August 18, 1911. Serial No. 644,823.

*To all whom it may concern:*

Be it known that I, RICHARD A. SCHULTZ, a citizen of the United States, and residing at Chicago, in the county of Cook and State of Illinois, have invented a new and useful Improvement in Retainers for Ball-Bearings, of which the following is a complete specification.

The main objects of this invention are to provide an improved retainer for ball bearings; to provide a retainer adapted to hold the balls therein with but slight friction on the balls; to provide a retainer having great strength and durability and not likely to get out of repair; and to provide a retainer adapted to properly space the balls and hold them in unvarying relation with respect to each other.

A specific embodiment of the invention is illustrated in the accompanying drawings, in which:

Figure 1 is a plan view of the retainer with the balls therein. Fig. 2 is a side elevation of the same. Fig. 3 is a perspective view of one of the ball spacers.

In the construction shown, the retainer ring or holder 1 for the ball spacers 2 is flattened in a plane at a right angle to its axis and is provided with a plurality of apertures in which the spacers are secured. Each spacer comprises a strip of sheet metal bent to a T shape with the short arm 3 thereof formed of the central portion of the strip, and the long arm 4 formed of the ends of the strip which are brought into contact flatwise against each other, as shown more clearly in Fig. 3. The extreme ends 5 of the plate forming the end of the arm 4 are reduced in size to provide fastening lugs adapted to extend through the apertures in the ring and be turned oppositely to hold the spacers in place, as shown more clearly in Fig. 2.

When secured on the ring the spacer arms 4 lie in planes parallel with radii of the ring, and the distance between the inner margins 6 of said arms is less than the diameter of the balls 7 which lie between said arms, while the arms 3 overlap the balls on the sides opposite from the ring 1. The outer edges of the arms 4 are cut inwardly with parallel slits 8 to provide a pair of tongues 9 which are bent oppositely to overlap the outer sides of the adjacent balls.

In operation the balls are held between the ring 1 and the arms 3 of the spacers, and between the edges 6 of the arms 4 and the tongues 9, leaving the sides of the balls adjacent the outer and inner edges of the ring free to contact with the bearing rings, not shown.

While but one specific embodiment of the invention has been herein shown, it will be understood that many details of the construction shown may be varied or omitted without departing from the scope of the claims.

I claim:

1. A retainer for ball bearings, comprising a ring, and a plurality of T shaped ball spacers thereon, each having a pair of laterally directed tongues adapted to hold the balls adjacent to said ring.

2. A retainer for ball bearings, comprising a ring, and a plurality of T shaped ball spacers on the ring, each having an arm parallel with a radius of the ring and provided at its outer edge with oppositely directed tongues adapted to hold the balls adjacent to said ring.

3. A retainer for ball bearings, comprising a ring, and a plurality of ball spacers on the ring, each spacer comprising a flat strip of metal having its ends in close contact flatwise and a central portion at right angles thereto, said ends having oppositely directed tongues formed in one edge thereof.

4. A retainer for ball bearings, comprising a ring, and a plurality of T shaped spacers on the ring, the arms of the spacers being flattened with one arm of each spacer lying parallel with the radius of the ring, and having oppositely directed tongues on its outer edge, said tongues being adapted to hold the balls adjacent to said ring.

5. A retainer for ball bearings comprising a ring, a plurality of T shaped spacers on said ring, lugs on one arm of each spacer inserted through an aperture in said ring, and bent over in the opposite side thereof, laterally directed tongues on said arm adapted to hold the balls adjacent to said ring, and the cross arm being integral with said arm.

6. A retainer for ball bearings comprising a ring, a plurality of plates substantially T shaped in cross section on said ring, said plates having arms interposed between adjacent balls, and oppositely directed tongues on said arms adapted to hold the balls adjacent to said ring.

7. A retainer for ball bearings comprising a ring, a plurality of plates substantially T shaped in cross section on said ring, said plates having arms interposed between adjacent balls and adapted to retain the balls from free inward radial movement, oppositely directed tongues on said arms adapted to retain the balls from free outward radial movement, and the cross arms of said plates, and said ring being adapted to retain the balls from free longitudinal movement, said plates, tongues and ring being normally out of contact with the balls.

In witness whereof I have hereunto subscribed my name in the presence of two witnesses.

RICHARD A. SCHULTZ.

Witnesses:
JOSEPH SCHLENKER,
ROBT. KLOTZ.

Copies of this patent may be obtained for five cents each, by addressing the "Commissioner of Patents, Washington, D. C."